United States Patent
Ma et al.

(10) Patent No.: US 8,055,981 B2
(45) Date of Patent: Nov. 8, 2011

(54) CONTROL SYSTEM FOR AN OPTICAL STORAGE DEVICE

(75) Inventors: Ching-Wen Ma, Nan Tou (TW); Zheng-Xiong Chen, Nan Tou County (TW); Shih-Hsien Liu, Chang Hua County (TW)

(73) Assignee: Sunplus Technology Co., Ltd., Hsin-Chu (TW)

( * ) Notice: Subject to any disclaimer, the term of this patent is extended or adjusted under 35 U.S.C. 154(b) by 1033 days.

(21) Appl. No.: 11/979,897

(22) Filed: Nov. 9, 2007

(65) Prior Publication Data
US 2008/0115018 A1    May 15, 2008

(30) Foreign Application Priority Data
Nov. 10, 2006 (TW) .............................. 95141605 A (51) Int. Cl.
*H03M 13/00* (2006.01)
(52) U.S. Cl. ....................................................... 714/784
(58) Field of Classification Search .................. 714/784, 714/731, 706, 707, 740, 746, 699, 814, 744, 714/789, 798
See application file for complete search history.

(56) References Cited

U.S. PATENT DOCUMENTS

| | | | | |
|---|---|---|---|---|
| 4,931,968 A | * | 6/1990 | Hirose | 250/363.07 |
| 7,486,461 B2 | * | 2/2009 | Fujii et al. | 360/51 |
| 7,626,908 B2 | * | 12/2009 | Nakagawa et al. | 369/59.23 |

* cited by examiner

*Primary Examiner* — Phung M Chung
(74) *Attorney, Agent, or Firm* — Muncy, Geissler, Olds & Lowe, PLLC (57) ABSTRACT

A control system determines read performance of an optical storage device according to lock performance of a re-timing signal. The control system includes a filtering and re-timing unit for receiving a radio frequency (RF) signal and outputting the re-timing signal and an un-corrected output signal, an error correction unit for receiving the un-corrected output signal and correcting an error bit according to a Reed-Solomon algorithm to generate a corrected output signal, a lock performance detector for receiving the re-timing signal and detecting the lock performance of the re-timing signal and then outputting a lock performance index, and a servo control loop for receiving the RF signal and the lock performance index and thus generating a servo control signal. When the lock performance index does not reach a threshold value, the servo control loop loads other control parameters to improve the read performance of the optical storage device.

11 Claims, 7 Drawing Sheets

CONTROL SYSTEM FOR AN OPTICAL STORAGE DEVICE

This application claims the benefit of the filing date of Taiwan Application Ser. No. 095141605, filed on Nov. 10, 2006, the content of which is incorporated herein by reference.

BACKGROUND OF THE INVENTION

1. Field of Invention

The invention relates to a control system for an optical storage device, and more particularly to a control system for determining read performance of an optical storage device according to lock performance of a re-timing signal.

2. Related Art

In a typical digital versatile disk (DVD) product, a method of adjusting a servo system parameter is to count the number of errors of an error correction code (ECC). When the number of the ECC errors is great, a servo system has to try another set of parameters and then count the number of the ECC errors again.

Figure 1:
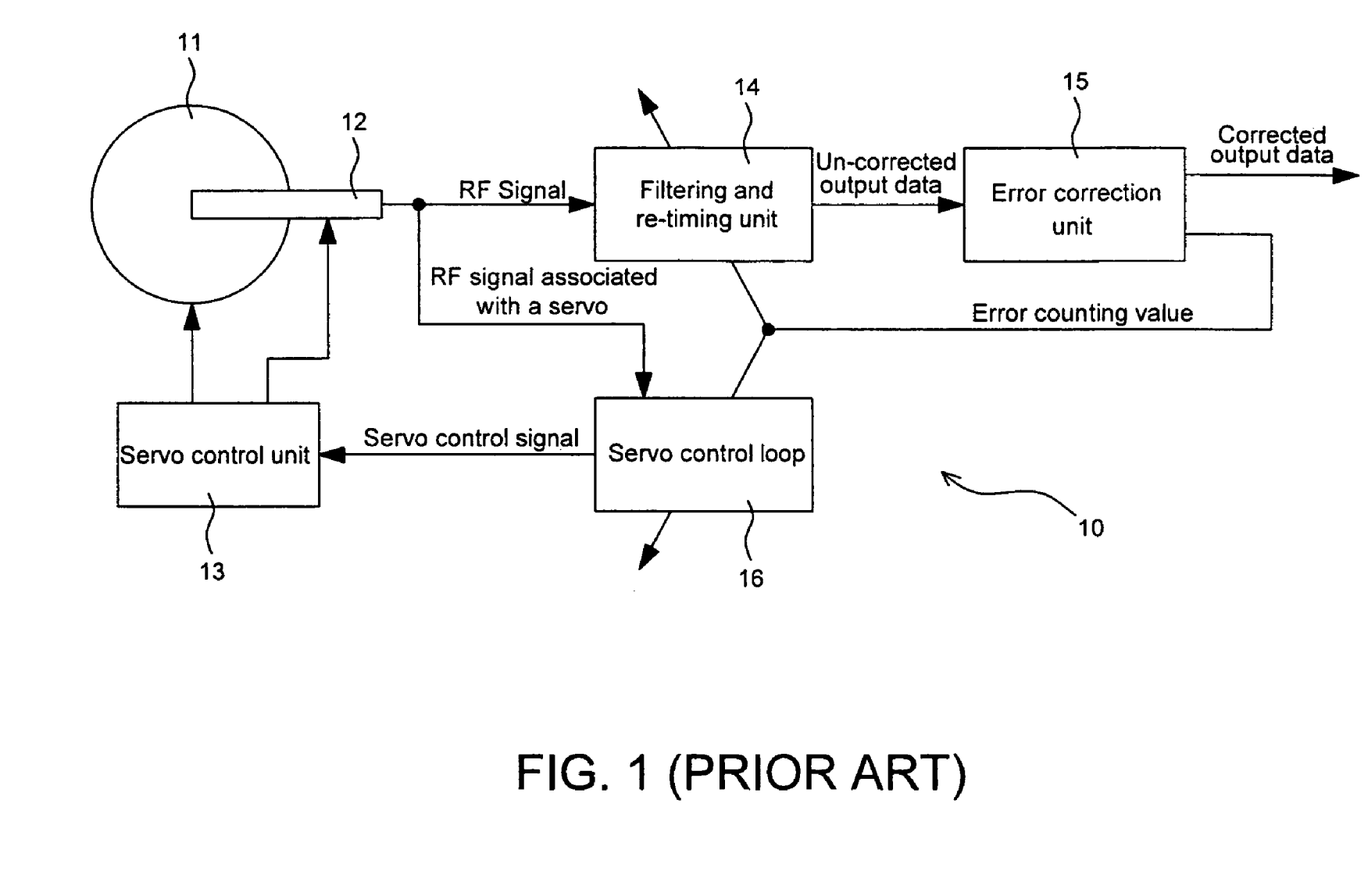
FIG. 1 shows the architecture of a conventional control system for an optical storage device.

FIG. 1 shows the architecture of a conventional control system for an optical storage device. Referring to FIG. 1, the control system 10 for the optical storage device includes an optical pickup 12, a servo control unit 13, a filtering and re-timing unit 14, an error correction unit 15 and a servo control loop 16. The optical pickup 12 reads a signal of an optical disc 11 and then generates a radio frequency (RF) signal. The filtering and re-timing unit 14 reads the RF signal and generates an un-corrected output signal. The error correction unit 15 reads the un-corrected output signal and then corrects an error bit in an error control code block of a data block memory cell according to a Reed-Solomon (RS) algorithm to generate a corrected output signal. When the error correction unit 15 is correcting the data, it also counts the number of errors and outputs an error counting value. The servo control loop 16 receives the error counting value and the RF signal associated with a servo, and outputs a servo control signal. The servo control unit 13 receives the servo control signal and controls operations of a spindle motor and the optical pickup 12.

When the number of the ECC errors (the error counting value) is great, the servo control loop 16 has to try another set of parameters to count the number of the ECC errors again. Because the time for counting the number of the ECC errors is longer, the time for the overall procedure of adjusting the servo system parameters is longer.

SUMMARY OF THE INVENTION

It is therefor an object of the invention to provide a control system for determining read performance of an optical storage device according to lock performance of a re-timing signal.

The invention achieves the above-identified object by providing a control system for determining read performance of an optical storage device according to lock performance of a re-timing signal. The control system includes a filtering and re-timing unit, an error correction unit, a lock performance detector and a servo control loop. The filtering and re-timing unit receives a RF signal and outputs the re-timing signal and an un-corrected output signal. The error correction unit receives the un-corrected output signal and corrects an error bit according to a Reed-Solomon algorithm to generate a corrected output signal. The lock performance detector receives the re-timing signal and detects the lock performance of the re-timing signal to output a lock performance index.

The servo control loop receives the RF signal and the lock performance index and thus generates a servo control signal. When the lock performance index does not reach a threshold value, the servo control loop loads another set of control parameters to improve the read performance of the optical storage device.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

The control system according to the invention will be described with reference to the accompanying drawings.

Figure 2:
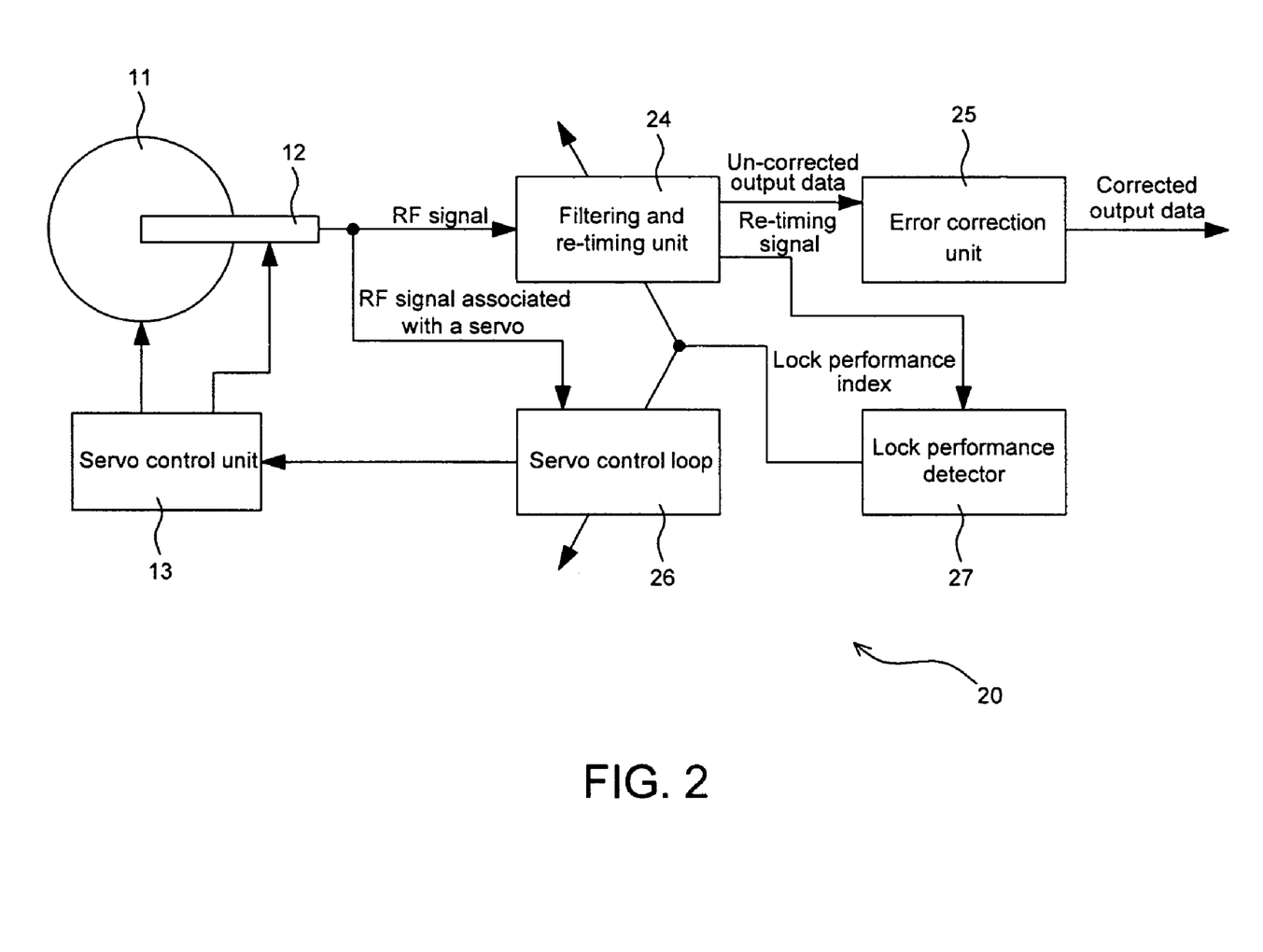
FIG. 2 shows the architecture of a control system for an optical storage device according to the invention.

FIG. 2 shows the architecture of a control system 20 for an optical storage device according to the invention. Referring to FIG. 2, the control system 20 includes an optical pickup 12, a servo control unit 13, a filtering and re-timing unit 24, an error correction unit 25, a servo control loop 26 and a lock performance detector 27. The optical pickup 12 reads a signal of an optical disc 11 and then generates a RF signal. The filtering and re-timing unit 24 reads the RF signal and generates an un-corrected output signal. The error correction unit 25 reads the un-corrected output signal and then corrects an error bit of an error control code block in a data block memory cell according to a Reed-Solomon algorithm to generate a corrected output signal. The invention mainly utilizes the lock performance detector 27 to detect a re-timing signal outputted from the filtering and re-timing unit 24, and to output a lock performance index as a reference for determining read performance of the optical storage device. The servo control loop 26 receives the lock performance index and the RF signal associated with a servo and outputs a servo control signal. The servo control unit 13 receives the servo control signal and controls operations of a spindle motor and the optical pickup 12.

The invention utilizes the lock performance detector 27 to detect the re-timing signal outputted from the filtering and re-timing unit 24 and to output the lock performance index as the reference for determining the read performance of the optical storage device. If the lock performance index reaches a predetermined level (e.g., exceeds a threshold value), it represents that the servo system has been adjusted to the predetermined level. If the lock performance index is not good (e.g., lower than the threshold value), it represents that the data reading condition of the system is not good, and the control parameter of the servo system has to be adjusted. Because the invention utilizes the lock performance detector 27 to replace the counted number of the ECC errors and the time for the lock performance detector 27 to generate the lock performance index is shorter, the invention can shorten the time of adjusting the servo system parameter.

Figure 3:
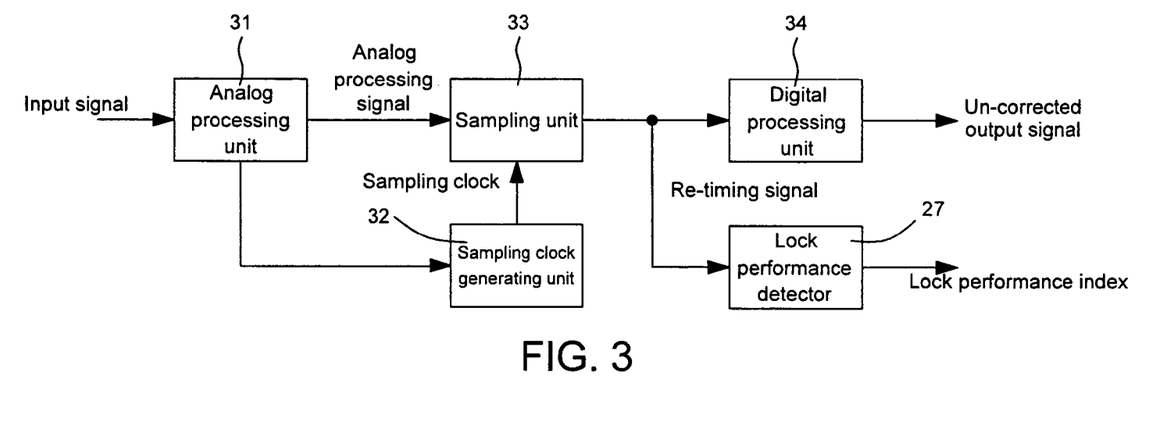
FIG. 3 shows the architecture of a lock performance detector in conjunction with a first type clock reconstructing loop.
Figure 4:
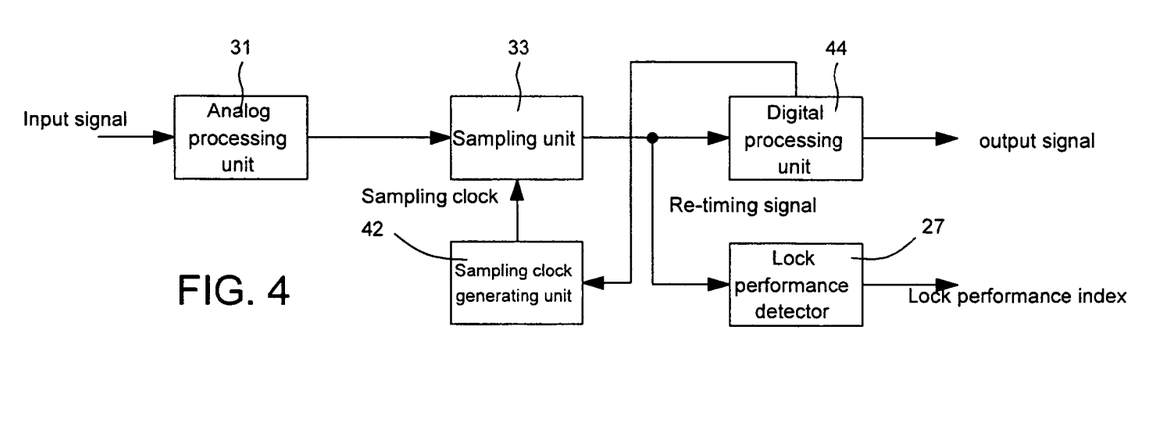
FIG. 4 shows the architecture of the lock performance detector in conjunction with a second type clock reconstructing loop.
Figures 5, 6:
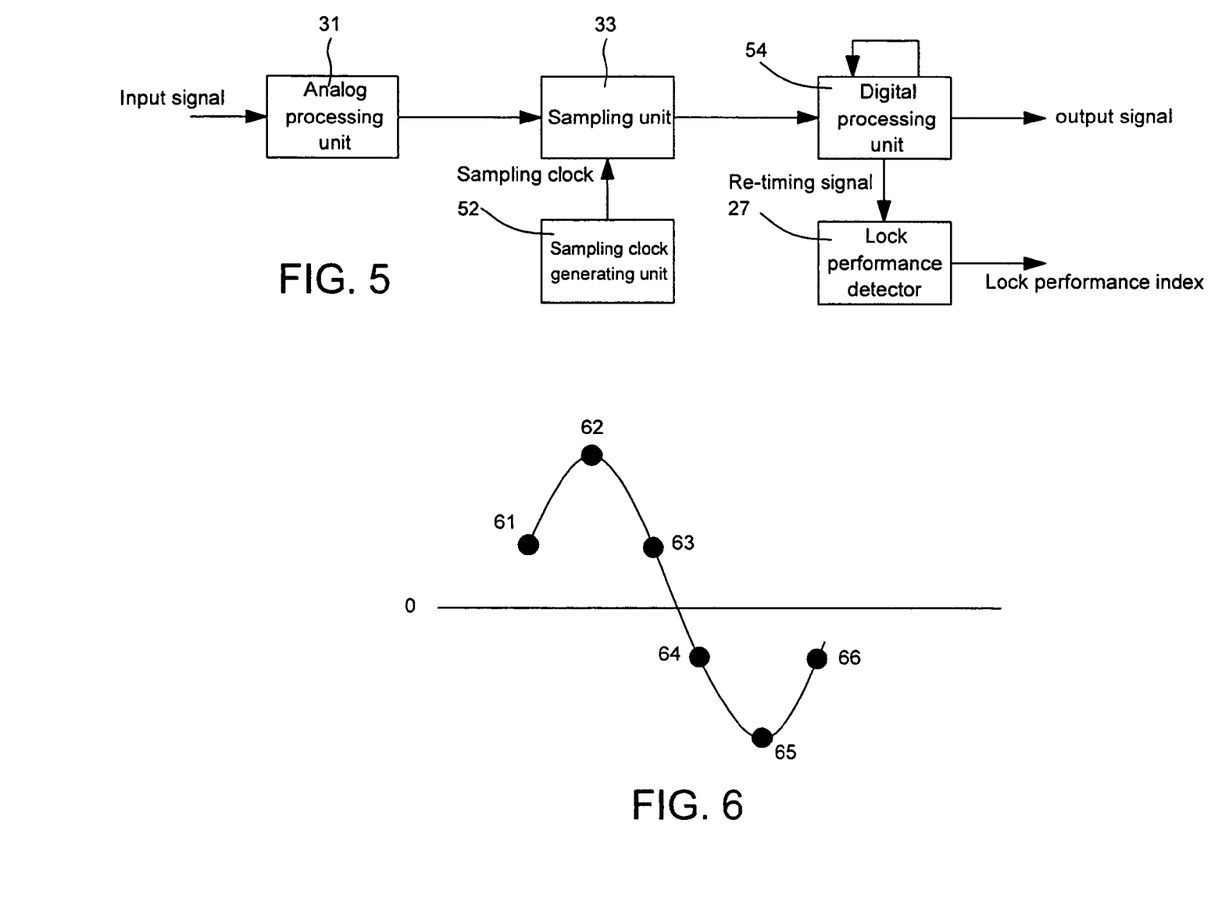
FIG. 5 shows the architecture of the lock performance detector in conjunction with a third type clock reconstructing loop.
FIG. 6 shows the waveform constituted by a re-timing signal.

FIGS. 3 to 5 shows the architectures of the lock performance detector 27 of the invention in conjunction with different types of clock reconstructing loops, wherein FIGS. 3 and 4 correspond to an analog sampling clock reconstructing loop and FIG. 5 corresponds to a fully digital sampling clock reconstructing loop.

As shown in FIG. 3, an analog processing unit 31 receives an input signal, and then generates an analog processing signal. A sampling clock generating unit 32 receives an output signal of the analog processing unit 31 and generates a sampling clock. A sampling unit 33 samples the analog processing signal according to the sampling clock and generates a re-timing signal. The lock performance detector 27 detects the quality of the re-timing signal and then generates the lock performance index. A digital processing unit 34 receives the re-timing signal and then generates the un-corrected output signal.

FIG. 4 is similar to FIG. 3 except that a sampling clock generating unit 42 is not controlled by the analog processing unit 31 but is controlled by a digital processing unit 44 and generates a sampling clock.

FIG. 5 is similar to FIG. 3 except that the sampling clock generating unit 42 generates a sampling clock with a constant frequency, and a digital processing unit 54 receives the re-timing signal and generates the un-corrected output signal.

FIG. 6 shows the waveform constituted by the re-timing signal. As shown in FIG. 6, data points 61 to 63 of the re-timing signal are greater than 0, and data points 64 to 66 of the re-timing signal are smaller than 0. Thus, the data points 63 and 64 are two points of the zero level crossing. When the lock performance of the re-timing signal is good, the two points are respectively located on two sides of the zero level and are equally spaced from the zero level. When the lock performance of the re-timing signal is poor, the data points 63 and 64 are not equally spaced from the zero level. The invention adopts a specially designed method to count the symmetrical properties of the data points 63 and 64. An analog-to-digital converter samples the RF signal into a signal having a sampling frequency greater than a data rate so that the data can be reproduced using a partial response maximum likelihood (PRML). If the signal quality is not bad, no re-timing signal appears around the zero. The invention also evaluates the quality of the present re-timing signal according to the symmetrical property of the re-timing signal at the zero-crossing point.

Figure 7:
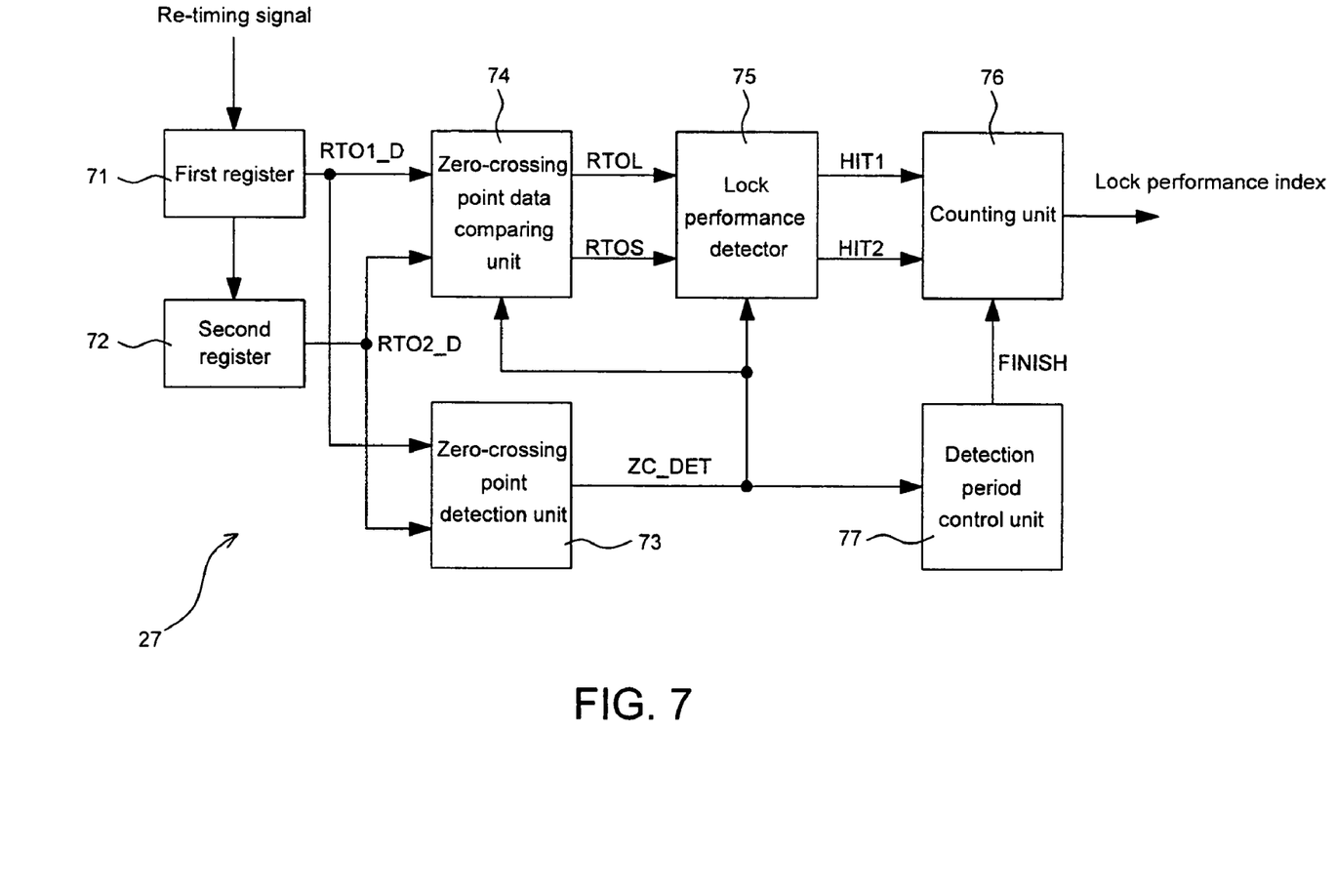
FIG. 7 is a block diagram showing a lock performance detector according to an embodiment of the invention.

FIG. 7 is a block diagram showing a lock performance detector according to an embodiment of the invention. Referring to FIG. 7, the lock performance detector 27 includes a first register 71, a second register 72, a zero-crossing point detection unit 73, a zero-crossing point data comparing unit 74, a lock performance detection unit 75, a counting unit 76 and a detection period control unit.

The first register 71 receives and stores the re-timing signal and transfers the stored data to the second register 72 when new data is received. Thus, the first register 71 and the second register 72 store the re-timing signal of the neighboring two points. The first register 71 outputs first data RTO1_D, and the second register 72 outputs second data RTO2_D. So, the data RTO1_D and RTO2_D are the front and rear points of the re-timing signal. The zero-crossing point detection unit 73 receives the first data RTO1_D and the second data RTO2_D, detects whether the data crosses the zero level, and outputs a zero-crossing signal ZC_DET. That is, when the first data RTO1_D and the second data RTO2_D cross the zero level, the zero-crossing signal is enabled or otherwise the zero-crossing signal is disabled.

The zero-crossing point data comparing unit 74 receives the first data RTO1_D, the second data RTO2_D and the zero-crossing signal, and outputs the larger data RTOL and the smaller data RTOS when the zero-crossing signal is enabled. That is, the distance from the larger data RTOL to the zero level is larger than the distance from the smaller data RTOS to the zero level. In other words, the larger data RTOL corresponds to the point obtained by taking a larger one of absolute values of two crossing points, and the smaller data RTOS corresponds to the point obtained by taking a smaller one of the absolute values of the two crossing points.

The lock performance detection unit 75 receives the larger data RTOL, the smaller data RTOS and the zero-crossing signal, and outputs a first counting signal HIT1 and a second counting signal HIT2 according to the lock quality when the zero-crossing signal is enabled. For example, when 1.5*RTOS>RTOL, it means that the first data RTO1_D and the second data RTO2_D are slightly symmetrical, so the first counting signal HIT1 is enabled. When RTOL−RTLS<=1, it means that the first data RTO1_D and the second data RTO2_D are quite symmetrical, so the second counting signal HIT2 is enabled. The weighting of the second counting signal HIT2 is higher than that of the first counting signal HIT1.

The counting unit 76 receives the first counting signal HIT1 and the second counting signal HIT2 and performs a counting operation when the first counting signal HIT1 and the second counting signal HIT2 are enabled. For example, the counting unit 76 adds 1 to the counting value when the first counting signal HIT1 is enabled; and the counting unit 76 adds 2 to the counting value when the second counting signal HIT2 is enabled.

The lock performance detection unit 75 and the counting unit 76 may also have different variations. For example, the invention may also assign different weighting coefficients according to different symmetrical properties, and the counting unit can assign the different weighting coefficients for calculation according to the bad-quality extent of the detection signal. For example, the weighting coefficient is set as 1 when 1.5*RTOS<=RTOL; the weighting coefficient is set as 2 when 2*RTOS<=RTOL; the weighting coefficient is set as 3 when 2.5*RTOS<=RTOL; and the weighting coefficient is set as 4 when 3*RTOS<=RTOL. Thus, the lock performance detection unit 75 outputs four counting signals and the counting unit 76 can add a changeable value to the counting value according to the different weighting coefficients set by the four counting signals.

The detection period control unit 77 receives the zero-crossing signal and controls the output operation of the counting unit 76 according to the zero-crossing signal. For example, the detection period control unit 77 can count the number of enabling times of the zero-crossing signal, and then enables and outputs a finishing signal FINISH to the counting unit 76 after the number of enabling times of the zero-crossing signal has exceeded a default number. Consequently, the counting unit 76 outputs the counting value as the lock performance index when the finishing signal FINISH is enabled. For example, the cyclic unit may be 4096 or 4096*2^N, wherein N is a positive integer.

Figure 8:
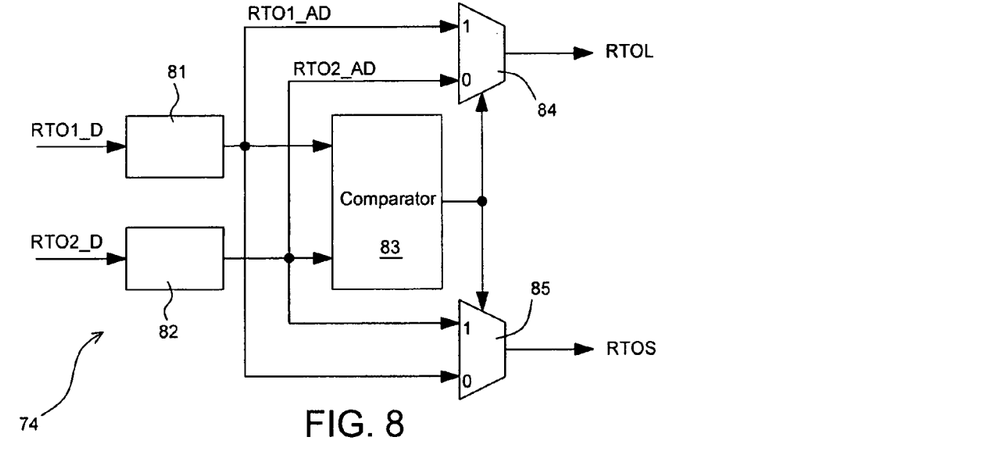
FIG. 8 shows an embodiment of a zero-crossing point data comparing unit.

FIG. 8 shows an embodiment of the zero-crossing point data comparing unit. Referring to FIG. 8, the zero-crossing point data comparing unit 74 includes two absolute value calculating units 81 and 82, one comparator 83 and two multiplexers 84 and 85. The absolute value calculating units 81 and 82 respectively receive the first data RTO1_D and the second data RTO2_D and then output two absolute values RTO1_AD and RTO2_AD to the comparator 83 and the two multiplexers 84 and 85. The comparator 83 compares the absolute values RTO1_AD and RTO2_AD with each other and then outputs a comparison signal to control the outputs of the multiplexers 84 and 85. That is, when the absolute value RTO1_AD is greater than or equal to the absolute value RTO2_AD, the multiplexer 84 outputs the absolute value RTO1_AD as the larger data RTOL, and outputs the absolute value RTO2_AD as the smaller data RTOS. Oppositely, when the absolute value RTO1_AD is smaller than RTO2_AD, the multiplexer 84 outputs the absolute value RTO2_AD as the larger data RTOL and outputs the absolute value RTO1_AD as the smaller data RTOS.

Figure 9:
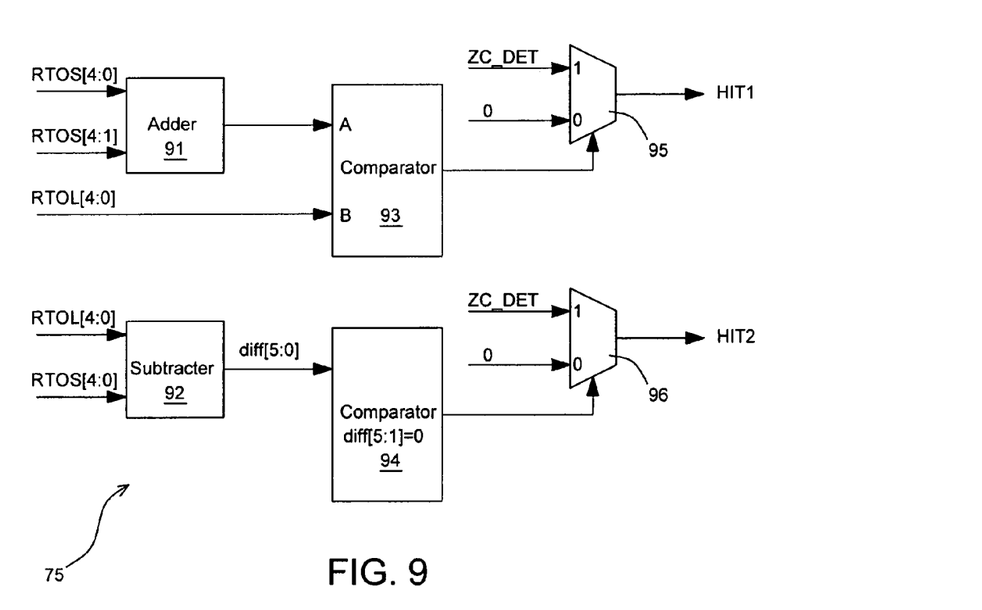
FIG. 9 shows an embodiment of a lock performance detection unit.

FIG. 9 shows an embodiment of the lock performance detection unit. Referring to FIG. 9, the lock performance detection unit 75 includes an adder 91, a subtracter 92, two comparators 93 and 94 and two multiplexers 95 and 96. The adder 91 adds the RTOS[4:0] and RTOS[4:1] together and then outputs the sum thereof to an input terminal A of the comparator 93. That is, the data outputted from the adder 91 is 1.5*RTOS. The comparator 93 compares the output data of the adder 91 with the larger data RTOL, and sets a first selection signal as 1 when the output data of the adder 91 is greater than the larger data RTOL, or otherwise sets the first selection signal as 0. The multiplexer 95 is controlled by the first selection signal and outputs the zero-crossing signal ZC_DET when the first selection signal is 1, or otherwise outputs 0. The subtracter 92 subtracts the larger data RTOL [4:0] and the smaller data RTOS[4:0] from each other. The comparator 94 determines whether the output result of the subtracter 92 is smaller than or equal to 1 by way of comparison. When the output result of the subtracter 92 is smaller than or equal to 1, the comparator 94 sets the second selection signal as 1, or otherwise sets the second selection signal as 0. The multiplexer 96 is controlled by the second selection signal and outputs the zero-crossing signal ZC_DET when the second selection signal is 1, or otherwise outputs 0.

Figure 10:
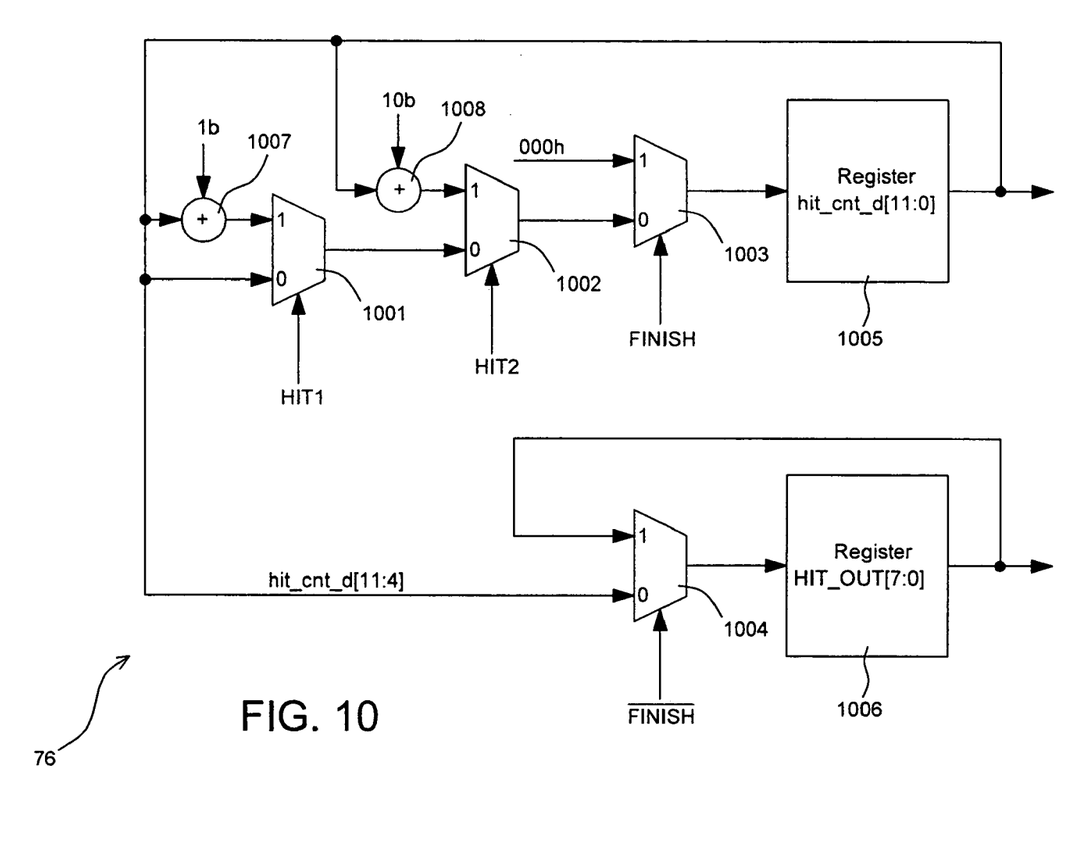
FIG. 10 shows an embodiment of a counting unit.

FIG. 10 shows an embodiment of the counting unit. Referring to FIG. 10, the counting unit 76 includes four multiplexers 1001 to 1004, two registers 1005 and 1006 and two adders 1007 and 1008. When the first counting signal HIT1 is 1 (enabled), the multiplexer 1001 outputs the data obtained after 1 has been added by the adder 1007. When the first counting signal HIT1 is 0 (disable), the multiplexer 1001 outputs the present counting value. When the second counting signal HIT2 is 1, the multiplexer 1002 outputs the data, which is obtained after 2 is added by the adder 1008. When the second counting signal HIT2 is 0 (disabled), the multiplexer 1002 outputs the value of the multiplexer 1001. When the finishing signal FINISH is 1, the multiplexer 1003 outputs the data of 000H and stores the data of 000H to the register 1005, and the multiplexer 1004 stores the data of the register 1005 to the register 1006. When the finishing signal FINISH is 0, the multiplexer 1003 outputs the value of the multiplexer 1002 and stores the value of the multiplexer 1002 to the register 1005, and the multiplexer 1004 stores the data of the register 1006 back to the register 1006.

So, the control system for the optical storage device according to the invention utilizes the lock performance detector to detect the lock performance of the re-timing signal as the reference for determining the read performance of the optical storage device, and the time for detecting the read performance of the optical storage device can be shortened. Consequently, when the lock performance index does not reach a threshold value, the servo control loop loads another set of control parameters to improve the read performance of the optical storage device. Of course, the time for the lock performance detector to detect the lock performance of the re-timing signal is shorter, so the servo control loop may also test multiple sets of control parameters and select the control parameter corresponding to the best lock performance index as the actual control parameter of the optical storage device.

In addition, the invention may also perform the quality detection according to the T number in a certain range, and adjust the parameter according to the crossing condition of the T number (e.g., 3T to 4T) in the certain range. That is, the detection is performed only if the condition of the set T number is satisfied. The lock performance detector 27 may include a signal length detection unit for calculating the time between neighboring two enabling instants of the zero-crossing signal ZC_DET and enabling a range control signal when the time satisfies a default time range. In addition, the counting unit 76 cannot count until the condition that the range control signal is enabled is satisfied.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications. For example, the embodiment is implemented by detecting the good extent of the symmetrical property. Of course, the bad extent of the symmetrical property may also be detected, and another set of control parameters is loaded when the bad extent is higher than a threshold value. For example, when 1.5*RTOS<=RTOL, it means that the symmetrical property is not good. When 2*RTOS<=RTOL, it means that the symmetrical property is too bad and the weighting coefficient of the counting value can be increased. In addition, the good quality may be determined by detecting the sufficient symmetrical property in this embodiment. However, the good quality may be determined when two crossing points are greater than a predefined value.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. A control system for determining read performance of an optical storage device according to lock performance of a re-timing signal, the control system comprising:
 a filtering and re-timing unit, for receiving a radio frequency (RF) signal and outputting the re-timing signal and an un-corrected output signal;
 an error correction unit, for receiving the un-corrected output signal and correcting an error bit to generate a corrected output signal according to a Reed-Solomon algorithm;
 a lock performance detector, for receiving the re-timing signal, detecting the lock performance of the re-timing signal and then outputting a lock performance index; and
 a servo control loop, for generating a servo control signal according to the RF signal and the lock performance index;
 wherein the servo control loop loads other control parameters to improve the read performance of the optical storage device when the lock performance index does not reach a threshold value.

2. The control system according to claim 1, wherein the filtering and re-timing unit is an analog filtering and re-timing unit or a fully digital filtering and re-timing unit.

3. The control system according to claim 1, wherein the lock performance detector comprises:
 a zero-crossing point detection unit, for receiving neighboring two pieces of point data of the re-timing signal and detecting whether the neighboring two pieces of point data cross a zero level or not, and enabling a zero-crossing signal when the neighboring two pieces of point data cross the zero level, or otherwise disabling the zero-crossing signal;
 a zero-crossing point data comparing unit, for receiving the neighboring two pieces of point data and the zero-crossing signal, and outputting one of the neighboring two pieces of point data, which has a larger absolute value, as a larger data and outputting the other of the neighboring two pieces of point data as a smaller data when the zero-crossing signal is enabled;
 a lock performance detector, for receiving the larger data, the smaller data and the zero-crossing signal, and generating a first counting control signal according to an approximating extent of the larger data to the smaller data when the zero-crossing signal is enabled;
 a counting unit, for receiving the first counting control signal and generating a counting value as the lock performance index after counting the number of enabling times of the first counting control signal; and
 a detection period control unit, for receiving the zero-crossing signal, controlling a detection time according to the number of enabling times of the zero-crossing signal, and enabling a finishing signal when the detection time terminates;
 wherein the counting unit further receives the finishing signal and outputs the counting value when the finishing signal is enabled.

4. The control system according to claim 3, wherein the lock performance is better as the lock performance index outputted from the lock performance detector is larger.

5. The control system according to claim 4, wherein the lock performance detection unit enables the first counting control signal when the smaller data multiplied by 1.5 is greater than the larger data and enables a second counting control signal when a difference between the larger data and the smaller data is smaller than or equal to 1.

6. The control system according to claim 5, wherein the counting unit adds 2 to the counting value each time when the second counting control signal is enabled.

7. The control system according to claim 6, wherein the counting unit further receives the range control signal and does not count until the range control signal is enabled.

8. The control system according to claim 3, wherein the lock performance is poorer as the lock performance index outputted from the lock performance detector is larger.

9. The control system according to claim 8, wherein the lock performance detection unit enables the first counting control signal when the smaller data multiplied by 1.5 is smaller than the larger data and enables a second counting control signal when a difference between the larger data and the smaller data is greater than or equal to 2.

10. The control system according to claim 9, wherein the counting unit adds 2 to the counting value each time when the second counting control signal is enabled.

11. The control system according to claim 3, wherein the lock performance detector further comprises a signal length detection unit for calculating a time between neighboring two enabling instants of the zero-crossing signal and enabling a range control signal when the time satisfies a default range.

* * * * *